F. DENMAN.
VEHICLE SPRING.
APPLICATION FILED SEPT. 9, 1910.

1,022,775.

Patented Apr. 9, 1912.
2 SHEETS—SHEET 1.

Witnesses
Milton Lenoir
E. M. Flatcher

Inventor
Frederick Denman
By Gillson & Gillson
Attorneys.

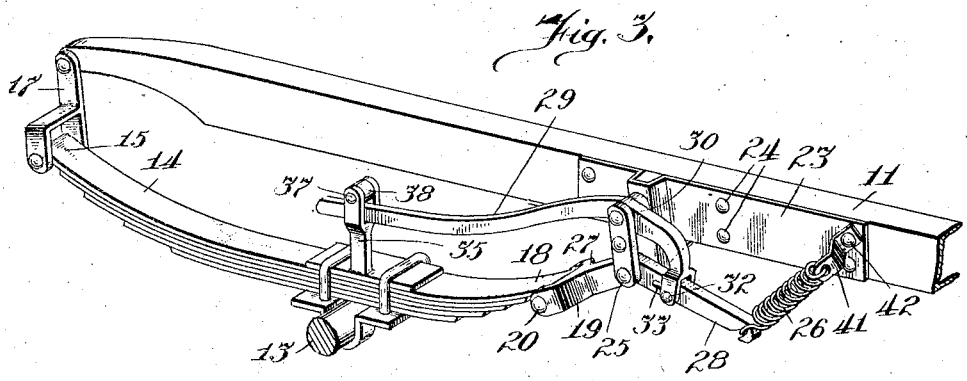
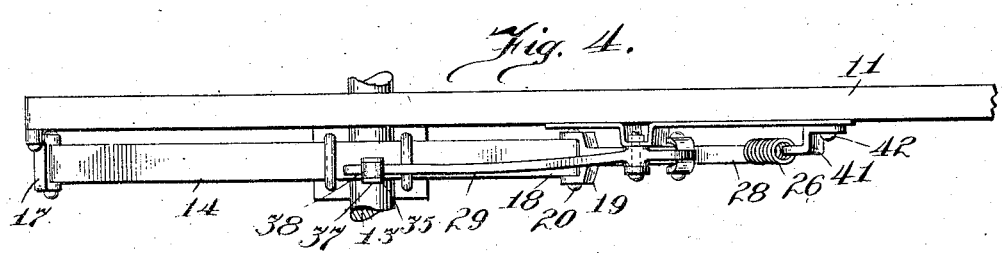
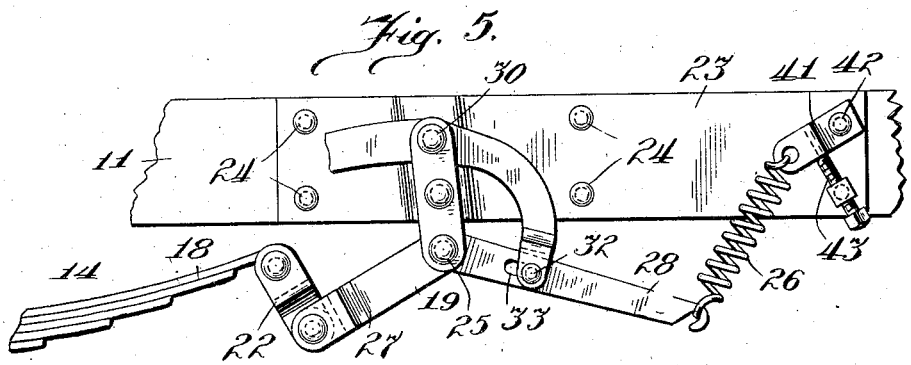
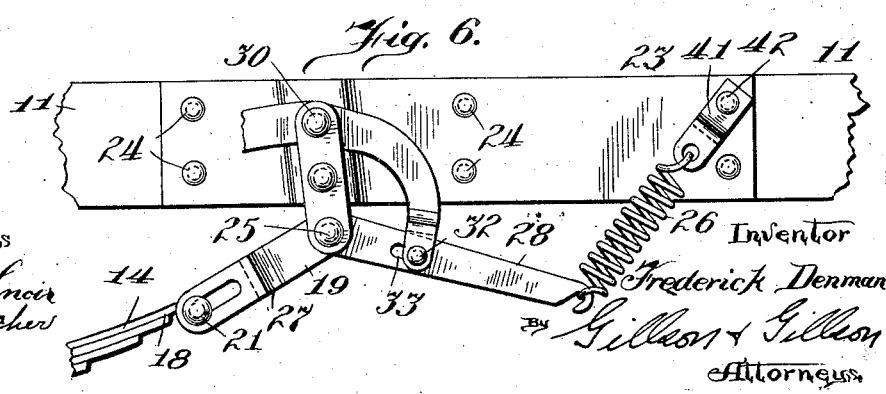

UNITED STATES PATENT OFFICE.

FREDERICK DENMAN, OF HIGHLAND PARK, ILLINOIS.

VEHICLE-SPRING.

1,022,775.  Specification of Letters Patent.  Patented Apr. 9, 1912.

Application filed September 9, 1910. Serial No. 581,297.

*To all whom it may concern:*

Be it known that I, FREDERICK DENMAN, a citizen of the United States, and resident of Highland Park, county of Lake, and State of Illinois, have invented certain new and useful Improvements in Vehicle-Springs, of which the following is a specification, and which are illustrated in the accompanying drawings, forming a part thereof.

The invention relates to cushioning devices adapted to be interposed between relatively movable parts, as for example, between the body and running gear of a vehicle.

It is well known that a spring, if flexible enough to cushion small amounts of relative movement between the parts which it connects, becomes flexed to a position in which it acts as a substantially rigid connection upon greater relative movement between the parts. This is objectionable in vehicle springs and the like for a spring adapted to cushion the vibration of the running gear in passing over the ordinary unevenness of a roadway will be quickly flexed so far as to serve as a rigid connection between the running gear and vehicle body when an unusual obstruction or depression is encountered in the roadway, and a severe jolting of the body results.

The object of the invention is to provide cushioning means for vehicles and the like which shall serve to effectually cushion both the small vibrations of the running gear and the severe jolts of the same.

To this end the invention contemplates the use of a spring for cushioning the small or ordinary vibrations of a part, as the running gear of a vehicle, and means for causing said spring to move independently of a connected part, as the body of a vehicle, when it has become so far flexed under a more severe vibration as to be substantially rigid, such movement being cushioned by a supplemental spring.

Figure 1:
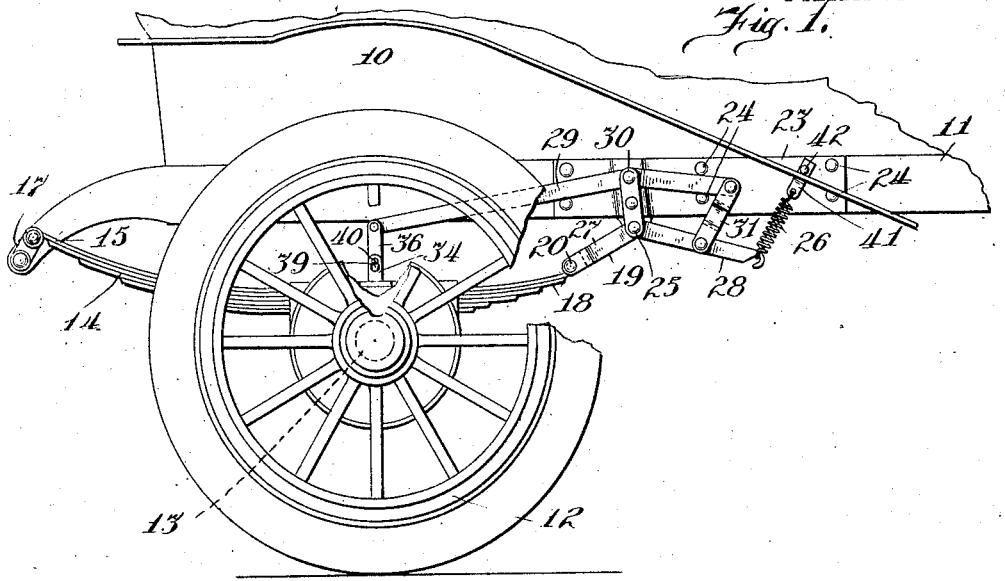
Figure 2:
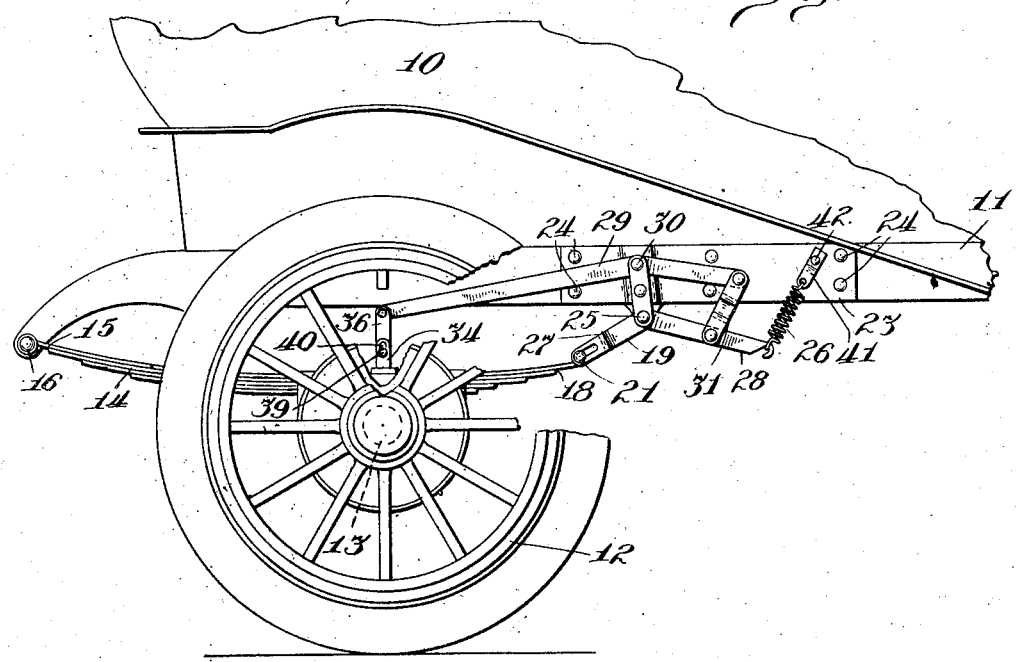

In the accompanying drawings:—Figure 1 shows in side elevation details of a spring supported vehicle equipped with appliances provided by the invention, some of the parts being broken away; Fig. 2 is similar to Fig. 1 but shows a slightly modified arrangement of the parts; Fig. 3 is a perspective view illustrating another arrangement of parts provided by the invention; Fig. 4 is a detail plan view of the parts illustrated in Fig. 3; and Figs. 5 and 6 are detail side views showing still further modifications.

Portions of the body of a vehicle are shown at 10 in Figs. 1 and 2 of the drawings. One of the side sills of the body 10 is designated 11. The running gear of the vehicle includes a wheel 12, and an axle 13, upon the end of which the wheel 12 is mounted.

In carrying out the invention a spring 14, sufficiently flexible to cushion the small or usual vibrations of the running gear is employed. As shown this spring is of well known semi-elliptic form and bears upon the axle 13 of the running gear intermediate its ends. One end 15 of the leaf spring 14 is pivotally connected to the side sill 11 of the vehicle. This connection may be either by means of a fixed pivot stud 16, shown in Fig. 2 of the drawings, or it may be such as will permit a small amount of longitudinal movement of the spring as by the use of a short link 17, shown in Figs. 1, 3 and 4. Preferably the other end 18 of the leaf spring 14 is attached to a lever 19. When the end 15 of the leaf spring 14 is connected to the side sill 11 by a link 17, the end 18 of the spring may be secured to the lever 19 in a manner which will not permit longitudinal play, as by means of the pivot bolt 20, shown in each of Figs. 1, 3 and 4. When, however, the end 15 of the leaf spring 14 is connected to the sill 11 by a fixed pivot, as at 16, Fig. 2, the end 18 of the spring is preferably connected to the lever 19 in a manner which will permit longitudinal play between the end of the spring and the lever, as by means of a stud 21, shown in Figs. 2 and 6, having sliding connection with the lever, or by means of the link 22, shown in Fig. 5.

The lever 19 is pivotally mounted upon the side sill 11 of the vehicle body. As shown a bracket plate 23 is applied to the side sill by bolts 24 and carries a pivot stud 25 for receiving the lever. The turning of the lever 19 upon its pivot 25 is resisted by a spring 26. Preferably the spring 26 is quite rigid and is so applied as to have sufficient power to practically hold the lever 19 in fixed position under ordinary vibration of the running gear and flexing of the spring 14. As shown, the lever 19 is made in the form of a bell crank and has arms 27, 28 of unequal length. The spring 26 is applied to the bell crank adjacent the end of the longer arm 28, whereas the spring 14 is connected to the shorter arm 27 of the bell crank.

Provision is made for positively turning the bell crank lever 19 against the effort of the spring 26 when there is a greater amount of relative vertical movement between the axle 13 of the running gear and the body 10 of the vehicle than will be effectually cushioned by the spring 14. As shown, a lever 29 is pivotally mounted upon the body of the vehicle, as upon a stud 30 carried by the bracket plate 23. One end of the lever 29 is connected to the bell crank lever 19. The other end of the lever 29 is connected to the running gear of the vehicle in such a way as to be moved thereby when there is an unusual amount of relative vertical movement between the body and running gear, as when the wheel 12 strikes an obstruction or passes into a depression in the roadway. To provide for relative movement between the lever 29 and the lever 19 incident to their being mounted upon different pivots the connection between the levers may be by means of link 31, shown in Figs. 1 and 2, or the levers may have a pin and slot connection 32, 33 shown in each of Figs. 3, 4, 5 and 6. For connection with the running gear of the vehicle the lever 29 preferably extends over the axle 13 and a post, designated by the numeral 34 in Figs. 1 and 2 of the drawings, or a post designated by the numeral 35 in Figs. 3 and 4 of the drawings, is applied to the leaf spring 14 immediately over the axle 13 to engage the lever and turn it on its pivot. As shown in Figs. 1 and 2, the end of the lever 29 is connected to the post 34 by a link 36, and in Figs 3 and 4 of the drawings the higher end of the post 35 is forked and receives the end of the lever between the arms of the fork. A stud 37 preferably connects the arms of the forked end of the post 35 above the lever 29. For preventing rattle the stud 37 most desirably is covered with a non-metallic substance, as by being inclosed within a sleeve 38 of fiber board between the ends of forked members of the post 35. Whether the connection of the lever 29 with the running gear be through the post 34 shown in Figs. 1 and 2, or the post 35 shown in Figs. 3 and 4, provision is preferably made for play between the post and the end of the lever in order that the lever will only be turned upon vertical movement of the running gear occasioned by encountering unusual obstructions or depressions in the roadway. As shown in Figs. 1 and 2 of the drawings, the link 36 has a pin and slot connection 39, 40 with the post 34, and in Figs. 3 and 4 of the drawings the forked end of the post 35 below the stud 37 is longer than the width of the lever 29.

With the arrangement described the leaf spring 14 will cushion the ordinary vibrations of the running gear in the usual way. When, however, the axle 13 and body 10 approach each other to an unusual extent the lever 29 will be turned by reason of its connection with the post 34, or 35. The relative upward movement of the running gear will now be cushioned by the spring 26, and the spring 14, turning upon the stud 16, or link 17, as a pivot, is swung upwardly with the running gear. In this way both the small vibrations and the usual jolts of the running gear are effectually cushioned and their transmission to the body prevented.

While the arms of the lever 29 are preferably of unequal length, the arm connected to the bell crank lever 19 being the shorter, the pivot 30 of the lever 29 is most desirably located in rear of the pivot 25 of the bell crank lever 19 in order that the distance from the pivot 30 to the point of connection between the levers may be greater than the distance from the pivot 25 to this point of connection. By means of this arrangement considerable movement may be imparted to the bell crank lever 19 by a slight turning of the lever 29.

If desired, provision may be made for adjusting the tension of the spring 26. As shown, one end of the spring 26 is attached to a clevis 41 and this clevis is pivotally attached to the bracket plate 23 at 42. The tension of the spring may be adjusted by swinging the clevis about on its pivot. As shown in Fig. 5 of the drawings a set screw 43 bears upon the clevis 41 to adjustably turn it on its pivot and thereby adjust the tension. While the set screw 43 is shown only in connection with the arrangement of parts illustrated in Fig. 5, it may obviously be used in connection with each of the other arrangements shown and described.

I claim as my invention:

1. In combination with a vehicle body and running gear, a leaf spring pivotally engaging the body at one end and bearing on the running gear intermediate its ends, a lever pivoted to the body intermediate its ends and adapted to be engaged at one end by the running gear upon relative upward movement of the latter, a second lever pivoted to the body intermediate its ends and connected at one end to the free end of the leaf spring, connection between the other end of said second lever and that end of the first named lever beyond its pivot from the point where it is adapted to be engaged by the running gear, and a second spring reacting between the last named end of the second lever and the vehicle body.

2. In combination with a vehicle body and running gear, a leaf spring pivotally engaging the body at one end and bearing on the running gear intermediate its ends, two levers independently pivoted to the body, one of said levers being adapted to be engaged by the running gear upon relative upward movement of the latter, and the other lever being connected to the other end of the leaf spring, connection between the levers, the pivot of the lever adapted to be engaged by the running gear being more remote from the said connection between the levers than the distance between the pivot of the other lever and said connection, and a second spring reacting between one of the levers and the vehicle body.

3. In combination with a vehicle body and running gear, a leaf spring pivotally engaging the body at one end and bearing on the running gear intermediate its ends, two levers independently pivoted to the body, one of said levers being adapted to be engaged by the running gear upon relative upward movement of the latter, and the other lever being connected to the other end of the leaf spring, connection between the levers, the pivot of the lever adapted to be engaged by the running gear being more remote from the said connection between the levers than the distance betwen the pivot of the other lever and said connection, and a second spring reacting between the last mentioned lever and the vehicle body, the point of engagement of said spring with said lever being more remote from the pivot of said lever than is the connection between the levers.

4. In combination with a vehicle body and running gear, a lever pivoted to the body, connection between the lever and running gear whereby the lever is turned on its pivot upon relative movement between the body and running gear in excess of a predetermined amount, a leaf spring having pivotal engagement at one end with the body and bearing on the running gear intermediate its ends, connection between the other end of the leaf spring and the lever whereby the spring is turned about its said pivotal engagement with the body by the said turning of the lever and a second spring resisting the said turning of the lever.

5. In combination with a vehicle body and running gear, a lever fulcrumed on the body, a spring reacting between the running gear and the lever whereby relative movement of the body and running gear tends to turn the lever on its fulcrum, a second spring reacting between the lever and the body and resisting the said turning of the lever, and means acting upon relative movement between the body and running gear in excess of a prédetermined amount for positively turning the lever on its fulcrum against the effort of the said second spring.

6. In combination with a vehicle body and running gear, a member movably mounted on the body, a spring reacting between the said movable member and the running gear whereby relative movement between the running gear and body tends to move such member on the body, a second spring reacting between the said movable member and the body and resisting the said movement of the member and means acting upon relative movement between the body and running gear in excess of a predetermined amount for positively moving said member against the effort of said second spring whereby the said second spring is positively brought into play when the first mentioned spring has been flexed a predetermined amount.

FREDERICK DENMAN.

Witnesses:
 E. M. KLATCHER,
 LOUIS K. GILLSON.